United States Patent [19]

Boney

[11] Patent Number: 4,683,546
[45] Date of Patent: Jul. 28, 1987

[54] FLOATING POINT CONDITION CODE GENERATION

[75] Inventor: Joel F. Boney, Austin, Tex.

[73] Assignee: Motorola, Inc., Schaumburg, Ill.

[21] Appl. No.: 918,682

[22] Filed: Oct. 14, 1986

Related U.S. Application Data

[63] Continuation of Ser. No. 787,025, Oct. 15, 1985, abandoned, which is a continuation of Ser. No. 567,830, Jan. 3, 1984, abandoned.

[51] Int. Cl.⁴ .................................................. G06F 7/48
[52] U.S. Cl. .................................. 364/748; 340/146.2
[58] Field of Search ............................ 364/748, 769; 340/146.2

[56] References Cited

U.S. PATENT DOCUMENTS

| | | | |
|---|---|---|---|
| 2,965,297 | 12/1960 | Alrich | 364/748 |
| 3,434,109 | 3/1969 | Coote | 340/146.2 |
| 3,825,895 | 7/1974 | Larson et al. | 340/146.2 |
| 4,429,370 | 1/1984 | Blau et al. | 364/748 |

OTHER PUBLICATIONS

Dumstorff et al. "Arithmetic Logical Unit A-Register Addressbility to Improve Microprocessor Compare Capability" *IBM Tech. Disclosure Bulletin* vol. 15, No. 3, pp. 1059-1060 Aug. 1972.

Chroust, "Simulating Logical Comparisons Using Arithmetic 'With Carry' OperOperations" *IBM Tech. Disclosure Bulletin* vol. 23, No. 4, pp. 1506-1507, Sep. 1980.

Stucka, "Using a Four-Bit Adder as a Comparator" *IBM Tech. Disclosure Bulletin*, vol. 26, No. 2, pp. 569-571, Jul. 1983.

*Primary Examiner*—David H. Malzahn
*Attorney, Agent, or Firm*—John A. Fisher; Jeffrey Van Myers

[57] ABSTRACT

A method and apparatus for generating floating point condition codes by using the data type of a result operand, rather than a magnitude relationship between two operands. The condition codes may then be combined to generate relations useful for identifying conditions for conditional branches or traps.

20 Claims, 4 Drawing Figures

FLOATING POINT CONDITION CODE GENERATION

This is a continuation of application Ser. No. 787,025, filed 10/15/85, now abandoned, which is a continuation of application Ser. No. 567,830, filed 1/3/84, now abandoned.

TECHNICAL FIELD

This invention relates to numerical data processors, and, more particularly, to the generation in a numerical data processor of certain condition codes resulting from defined floating point arithmetic operations.

BACKGROUND ART

In integer 2's complement arithmetic, every representable bit pattern has a numeric value. In the proposed IEEE standard relating to floating-point (real) number system formats, several types of values are defined:
1. Normalized numbers
2. Zero
3. Infinity
4. Denormalized numbers
5. Not numbers (NaNs)

For purposes of this description, denormalized numbers may be treated the same as very tiny normalized numbers.

The currently proposed standard for floating point numbers proposed by the IEEE requires, among other things, that "It shall be possible to compare floating point numbers in all supported formats even if the operands' formats differ . . . Four mutually exclusive relations are possible: 'less than', 'equal', 'greater than', and 'unordered'. The last case arises when at least one operand is NaN. Every NaN shall compare 'unordered' with everything, including itself. Comparisons shall ignore the sign of zero ($so + 0 = -0$)."

In known floating point condition code generation systems, the above relations are generated directly, through the use of complex logic, from the magnitude relationships between the two operands. This requires extensive logical operation and circuitry.

SUMMARY OF THE INVENTION

Accordingly, it is an object of the instant invention to provide an improved method for generating floating point condition codes that can then be used to test for the four required relations.

The foregoing object of the instant invention is accomplished by providing a method for generating floating point condition codes by using the data type of a result operand, rather than a magnitude relationship between two operands.

DESCRIPTION OF THE INVENTION

Figure 1:
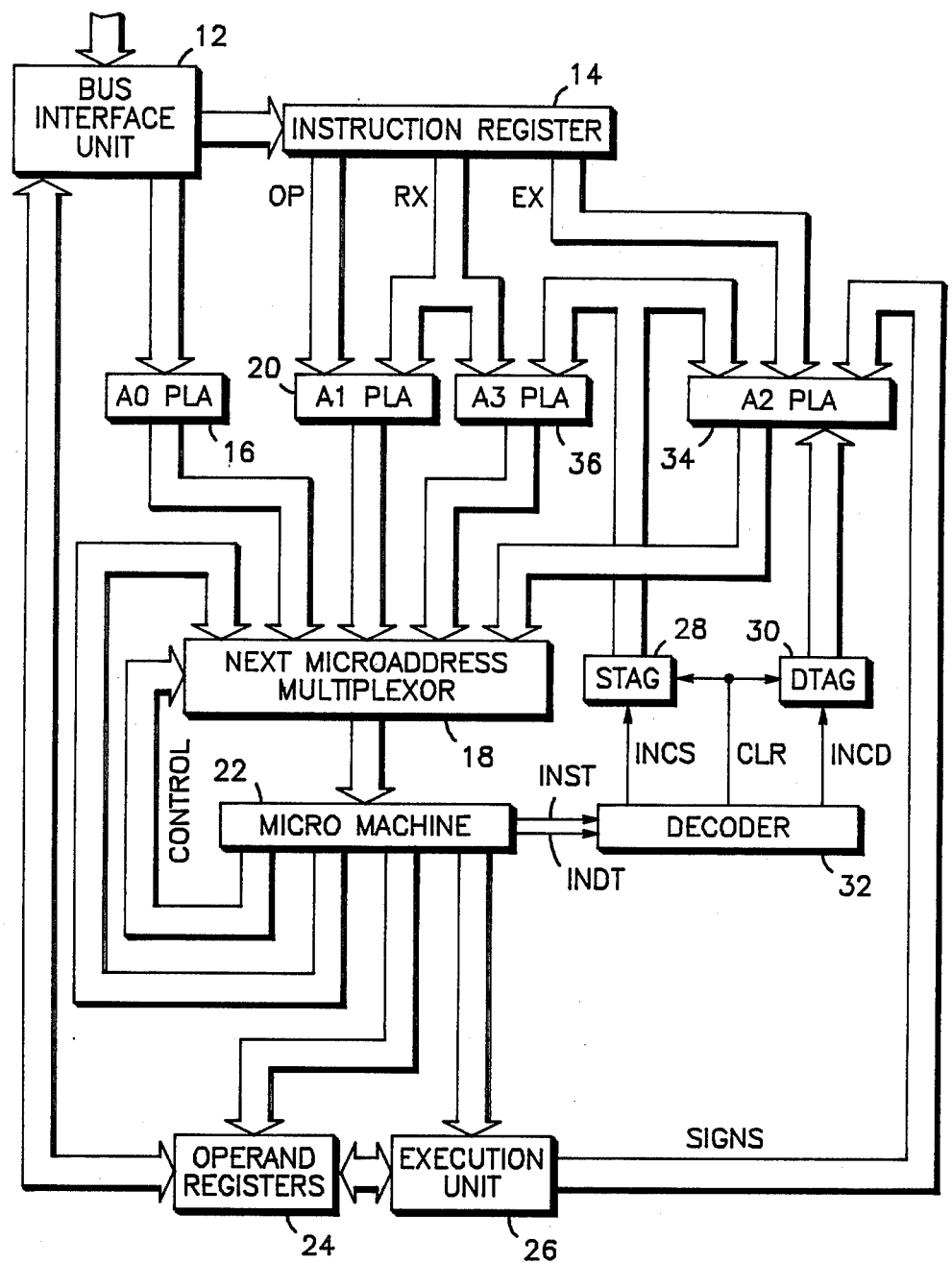
FIG. 1 is a block diagram of a data processor which utilizes the present invention.
Figure 2:
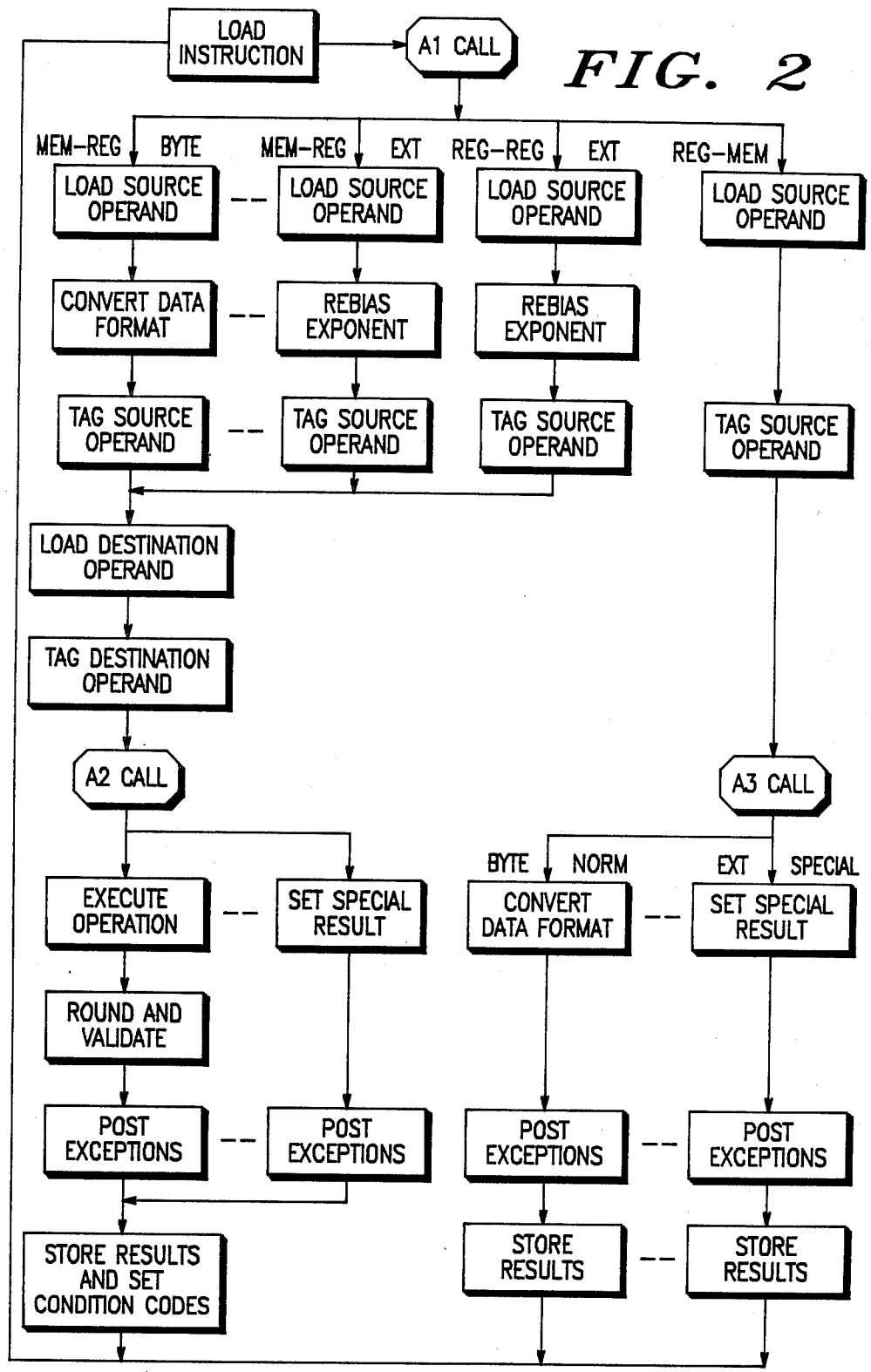
FIG. 2 is a flow diagram illustrating the instruction processing sequence of the data processor of FIG. 1.

Shown in FIG. 1 is a data processor 10 which is constructed in accordance with the preferred embodiment of the present invention. In operation, processor 10 executes instructions generally in accordance with the flow diagram shown in FIG. 2. Although processor 10 is capable of executing several different types of instructions, the present invention is primarily directed toward those instructions which specify any of a plurality of different numerical operations to be performed upon an operand which may have any of a plurality of different data formats. For the purposes of the present invention, such numerical operations may be either monadaic (such as sin, arctan, square root, etc.) or dyadic (such as add, multiply, etc.); while the data formats may be different in length (such as byte, word, long word, etc.). Such a processor is also capable of operating on data of different forms (such as integer, BCD, floating point, etc.) but emphasis will be on floating point operations.

Initially, a bus interface unit 12 loads each instruction to be executed by processor 10 into an instruction register 14. Although the bus interface unit 12 could be a bus controller such as that shown and described in U.S. Pat. No. 4,348,722, the preferred implementation is in the form of a coprocessor interface such as that shown and described in copening application (Ser. No. 485,672), Zolnowsky et al, filed Apr. 18, 1983 and assigned to the assignee of the present invention. In either form, the bus interface unit 12 initiates instruction execution by enabling a A∅ programmable logic array (PLA) 16 to provide to a next microaddress multiplexor 18 the microaddress of an execution initiation microsequence. Simultaneously, an A1 PLA 20 selects the microaddress of a preprocessing microsequence appropriate for the particular operation class (OP) of the instruction (i.e. memory-to-register, register-to-register or register-to-memory) and, if necessary, the data format of the source operand RX.

Assuming that micromachine 22 is initially idle, multiplexor 18 will be enabled to immediately forward the A∅ microaddress to the micromachine 22. In the preferred form, the execution initiation microsequence delays the micromachine 22 until the A1 PLA 20 has had time to resolve, before enabling multiplexor 18 to forward the A1 microaddress to micromachine 22.

If the class of the instruction is, for example, memory-to-register, the preprocessing microsequence called by the A1 PLA 20 will initially direct micromachine 22 to cooperate with the bus interface unit 12 in loading the source operand into one of several operand registers 24. The preprocessing microsequence will then enable micromachine 22 to control an execution unit 26 in a series of operand manipulation steps in order to convert the original source operand into an internal data format. This converted operand is preferably retained in a working register (not shown) in execution unit 26.

In the preferred form, the particular internal data format will be carefully chosen so as to be a "superset" of all of the available data formats. For example, assume that operands can be expressed as integers in lengths of one (1) byte, word, long word; as base 10 floating point numbers in packed binary coded decimal (BCD) form; or as base 2 floating point numbers in single, double or extended precision. Except for a few special cases, such as inaccuracies which inevitably occur in converting from base 10 floating point to base 2 floating point, an operand in any of these diverse formats can be converted into the base 2 extended precision floating point format without loss of either range or precision. Similarly, after the desired numerical operation has been performed, the result can be converted back into any of these formats while preserving as much range and precision as would have been possible if the operand had not been converted at all. In this example, the base 2 extended precision floating point format is the desired "superset" and is the preferred internal data format.

If the operand which is being loaded from memory is already in base 2 extended precision floating point format, no format conversion as such is required. However, the exponent form used externally is typically biased by the hexidecimal value $3FFF, while the preferred form used within execution unit 26 is biased by −1 in order to facilitate two's complement manipulation. Accordingly, the preprocessing microsequence in the preferred form will direct micromachine 22 to step execution unit 26 through a brief series of manipulations which rebias the exponent of the operand in the working register. Similarly, if the class of instruction is register-to-register, the preprocessing microsequence will simply direct the micromachine 22 to load an operand from the appropriate one of the operand registers 24 into execution unit 26 and then to step execution unit 26 through the exponent rebiasing sequence.

After the operand format conversion or exponent rebiasing is complete, the preprocessing microsequence directs micromachine 22 to "tag" the resultant operand as to data type. For the purposes of the present invention, the operand can be any of four (4) data types: normalized (NORM); zero (ZERO); infinity (INF); or "not-a-number" (NAN). For an extended precision floating point operand, the normalized data type includes: "normalized", i.e. having an exponent greater than or equal to the minimum possible exponent but less than the maximum possible exponent and a non-zero significand having a most significant bit (MSB) of one (1); "denormalized", i.e. having a minimum exponent and a non-zero significand having an (MSB) of zero ($\phi$); and "unnormalized", i.e. having an exponent greater than the minimum but less than the maximum and a non-zero significand having an MSB of zero ($\emptyset$). The ZERO data type, on the other hand, has an exponent equal to the minimum and an all-zero significand; while the INF data type has an exponent equal to the maximum and an all-zero fraction. Finally, the NAN data type has an exponent equal to the maximum and a non-zero fraction.

Figure 3:
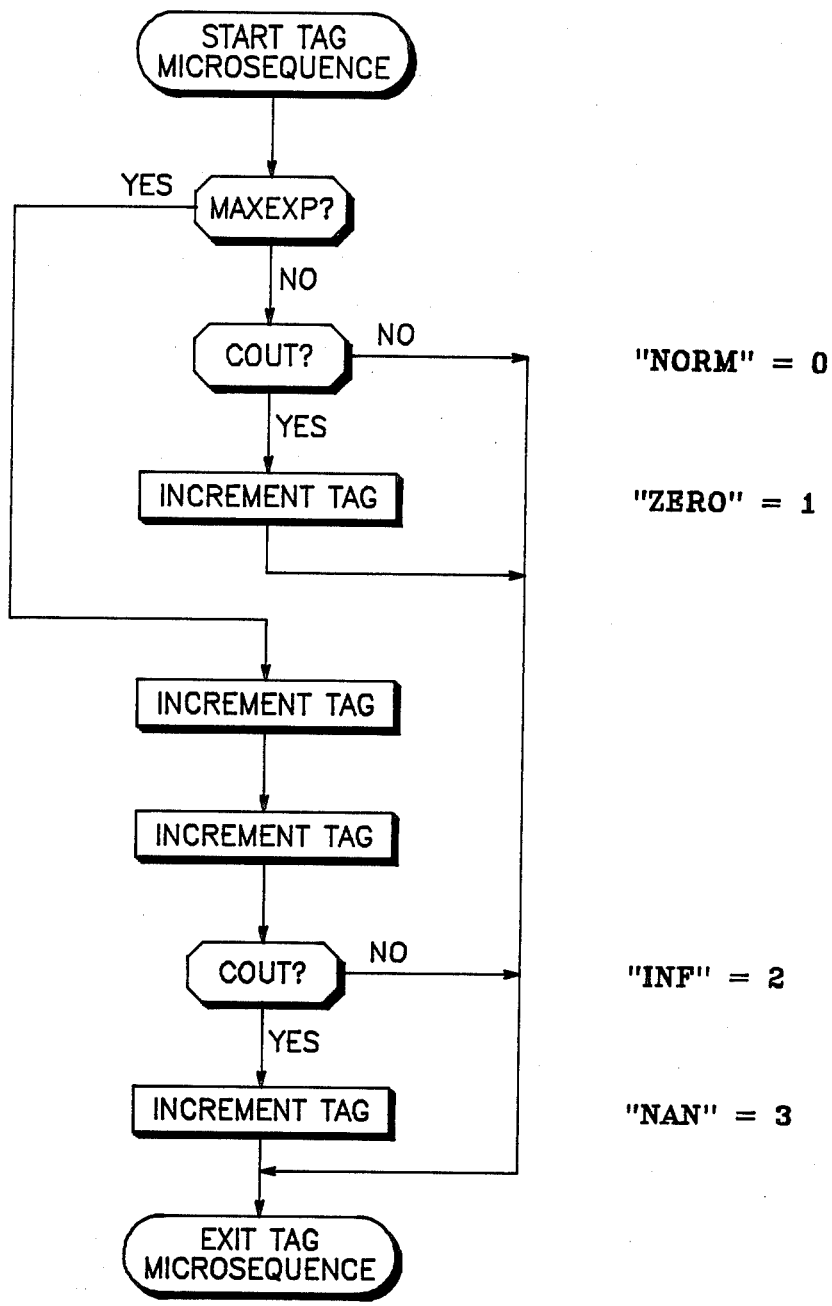
FIG. 3 is a flow diagram detailing the operand tagging sequence in the instruction processing sequence of FIG. 2.

As shown in FIG. 3, the tagging portion of the preprocessing microsequence initially enables micromachine 22 to clear a source operand tag (STAG) register 28 and a destination operand tag (DTAG) register 30 by simultaneously asserting both an "increment source tag" (INST) signal and an "increment destination tag" (INDT) signal to a decoder 32. The tagging microsequence then directs the micromachine 22 to enable execution unit 26 to compare the exponent of the operand to the maximum possible exponent. If execution unit 26 signals "not equal", micromachine 22 is then directed to enable execution unit 26 to determine if the significand of the operand is all zeros. One convenient way to perform this test is to complement the significand, add one (1) and watch for a carry out. If execution unit 26 signals "no carry out", the significand of the operand must be non-zero, and the tagging microsequence, having successfully determined that the operand is normalized, may exit leaving a value of "$\emptyset$" in STAG 28. On the other hand, if execution unit 26 signals "carry out", the significand must be zero, and the tagging microsequence will enable micromachine 22 to increment STAG 28 by asserting only INST to decoder 32, and then exiting leaving a value of "1" in STAG 28.

If the execution unit 26 signals that the exponent of the operand is "equal" to the maximum exponent, the tagging microsequence will enable micromachine 22 to increment STAG 28 by two (2) by twice asserting INST to decoder 32. Micromachine 22 is then directed to enable execution unit 26 to determine if the fraction portion of the significand is all zeros. As before, if execution unit 26 signals "carry out", the fraction must be zero, and the tagging microsequence, having determined that the operand is infinity, may exit leaving a value of "2" in STAG 28. If, on the other hand, execution unit 26 signals "no carry out", the fraction must be non-zero, and the tagging microsequence will enable micromachine 22 to increment STAG 28 by asserting INST once to decoder 32, and then exiting leaving a value of "3" in STAG 28.

Upon completion of the tagging of the source operand, the preprocessing microsequence enables micromachine 22 to load a destination operand (which may be meaningless if the selected operation is not dyadic) from the appropriate one of the operand registers 24 into a working register (not shown) in execution unit 26. The preprocessing microsequence will again execute the tagging microsequence to "tag" the destination operand. This time, however, the tagging microsequence does not enable micromachine 22 to clear STAG 28 and DTAG 30, but simply proceeds to analyze the destination operand for data type. By the end of the tagging microsequence, the value in DTAG 30 will reflect the appropriate code as described above.

Upon completing the tagging of the destination operand, if any, the preprocessing microsequence directs micromachine 22 to enable an A2 PLA 34 to provide the microaddress of an operation execution microsequence which is appropriate for the particular numerical operation indicated in the extension (EX) portion of the instruction register 14. The preprocessing microsequence will then exit after directing micromachine 22 to enable multiplexor 18 to forward the A2 microaddress.

Often, when the operand(s) have one of the special data types (i.e. zero, infinity or NAN), the result of a particular numerical operation will be a default value (e.g. +zero, −infinity, etc.). In order to detect as early as possible such special cases as divide by zero, multiply by infinity or an operand which is a NAN, the operation execution microsequence selected by A2 PLA also depends upon the tag information in STAG 28 and DTAG 30. Assuming initially that the operand(s) are tagged as normalized, then the A2 PLA will provide the microaddress of the actual operation execution microsequence. Depending upon the selected numerical operation, the operation execution microsequence will enable micromachine 22 to control execution unit 26 in an appropriate series of steps to accomplish the operation. The operation execution microsequence will then direct micromachine 22 to post any exceptions incountered in performing the operation. In the preferred form, such exceptions include: overflow, underflow, inexact (rounded result), divide by zero, and invalid operation.

In contrast, assume now that the operand(s) are tagged as one of the special data types (i.e. zero, infinity or NAN). In this case, the A2 PLA will provide the microaddress of a special operation microsequence which, if appropriate, will simply direct micromachine 22 to store the default result in the destination operand register 24, before posting the corresponding exception if any. From just this aspect of the present invention, three very significant benefits are realized: the operation execution microsequences are relieved of the duty of detecting and handling special cases, thus allowing faster operation execution; all such special cases are handled very fast since no calculation need be done; and substantial microcode space is saved since these special operation microsequences can be shared by all instructions.

After posting any exceptions, both the operation execution and special operation microsequences direct micromachine 22 to store the result which is still in a working register (not shown) in execution unit 26 back into a selected one of the operand registers 24. The micromachine 22 will then be enabled to set the appropriate condition codes and log any posted exceptions into a status register (not shown) within bus interface unit 12 for use by the user. Multiplexor 18 will then be enabled to forward the A∅ microaddress if and when the next instruction is received for execution. In the preferred form, the clocks are also stopped to save power, and bus interface unit 12 will restart the clocks only when the next instruction has been loaded into instruction register 14.

If the instruction class is register-to-memory, indicating that a previously calculated result is to be stored into memory, the preprocessing microsequence called by the A1 PLA 20 will initially direct micromachine 22 to load a particular source operand from one of the several operand registers 24 into execution unit 26. The preprocessing microsequence will then direct micromachine 22 to perform the tagging microsequence to tag the source operand.

Upon completing the tagging of the source operand, the preprocessing microsequence directs micromachine 22 to enable an A3 PLA 36 to provide the microaddress of an operand conversion microsequence which is appropriate for the converting the source operand from the internal data format to the external data format indicated in the instruction. The preprocessing microsequence will then exit after directing micromachine 22 to enable multiplexor 18 to forward the A3 microaddress.

Depending upon the selected external data format, the operand conversion microsequence will then enable micromachine 22 to control execution unit 26 in a series of operand manipulation steps in order to convert from the internal data format into a selected one of the several external data formats. The operand conversion microsequence will then direct micromachine 22 to post any exceptions encountered in performing the operation. After posting any exceptions, both the operand conversion microsequence directs micromachine 22 to cooperate with bus interface unit 12 to store the result which is still in a working register (not shown) in execution unit 26 into a selected location in external memory (not shown). The micromachine 22 will then be enabled to set the appropriate condition codes and log any posted exceptions into a status register (not shown) within bus interface unit 12 for use by the user. Multiplexor 18 will then be enabled to forward the A∅ microaddress if and when the next instruction is received for execution. In the preferred form, the clocks are also stopped to save power, and bus interface unit 12 will restart the clocks only when the next instruction has been loaded into instruction register 14.

The condition codes sent to the status register of the bus interface unit 12 contains four condition codes which may be set at the end of all move and arithmetic instructions involving the floating point data registers except for the move multiple instructions. The condition codes are:

N—Last result was Negative (sign bit)
Z—Last result was Zero
I—Last result was infinity
NAN—Last result was a NAN or a floating point compare was unordered The four floating point condition code (FPCC) bits are set based upon the operation's result data type as follows:

| N | Z | I | NAN | Result Data Type |
|---|---|---|-----|------------------|
| 0 | 0 | 0 | 0 | + normalized or denormalized |
| 1 | 0 | 0 | 0 | − normalized or denormalized |
| 0 | 1 | 0 | 0 | + 0 |
| 1 | 1 | 0 | 0 | − 0 |
| 0 | 0 | 1 | 0 | + infinity |
| 1 | 0 | 1 | 0 | − infinity |
| X | 0 | 0 | 1 | NAN |

Since data type is closely related to data format, the condition codes may be generated in one of the following ways:

For an implementation which produces arithmetic results in one of the IEEE standard's rigidly defined basic formats (single or double), the following table describes the data type in accordance with the smallest and largest normalized numbers for each format ("minexp" and "maxexp", respectively).

|  | result exponent = exp | fraction* |
|---|---|---|
| normalized | minexp <= exp <= maxexp | (1.)xx . . . xx |
| denormalized | minexp − 1 | (0.)<non-zero> |
| zero | minexp − 1 | (0.)00 . . . 00 |
| infinity | maxexp + 1 | (x.)00 . . . 00 |
| nan | maxexp + 1 | (x.)<non-zero> |

*the integer part bit is implicit in the basic formats

For an implementation which produces arithmetic results in an extended format which conforms to the IEEE standard's loose definition (the preferred definition in the present invention) the following applies:

Since the IEEE standard does not rigidly specify data formats for extended precision, the following only describes the data-type definitions of the present invention.

The extended format utilizes an explicit integer part bit (j). The standard permits an extended format to utilize either an implicit or explicit integer part bit. Also, the standard very loosely defines the reserved exponents used for the zero, infinity, denormalized and NAN data types. This implementation follows the conventions of the basic formats in its choice of reserved exponents for the extended format. However, these techniques could be easily adapted to any extended precision which conforms to the standard.

|  | result exponent = exp | fraction* |
|---|---|---|
| normalized | minexp <= exp <= maxexp | 1.xx . . . xx |
| denormalized | minexp | 0.<non-zero> |
| zero | minexp | 0.00 . . . 00 |

-continued

| | result exponent = exp | fraction* |
|---|---|---|
| infinity | maxexp + 1 | x.00...00 |
| nan | maxexp + 1 | x.<non-zero> |

*the integer part bit is explicit in the basic formats.

To establish the FPCCs in the extended case:
Define a floating point mantissa (significand) as the bit string:

j.ffff...ffff where the "j." is the explicit integer part bit and "ffff...ffff" is the fraction.

The following definitions describe hardware elements (latches):
result sign = SIGN_FLAG
result integer part bit (j) = N_OUT
logical-OR of all result fraction bits = C_OUT
result exponent equal to (maxexp+1) = MAXEXP
Both C_OUT and MAXEXP could be either the output of a hardware comparator or internal AU conditions.

The following equations describe the logic required for setting FPCCs on an implementation which produces extended format results:
N = SIGN_FLAG
Z = not (MAXEXP) and not (C_OUT) and not (N_OUT)
I = MAXEXP and not (C_OUT)
NAN = MAXEXP and C_OUT Note that the FPCCs do not distinguish between normalized and denormalized numbers. This capability could easily be implemented by defining an additional hardware element:

result exponent equal to (minexp) = MINEXP and defining an additional FPCC bit, "D" for denormalized. The following equation would then set the D bit of FPCC:

D = MINEXP and C_OUT and not (N_OUT)

A "D" FPCC bit would be useful in an implementation which produced results in a basic format. Since the present invention produces results in an extended format, a "D" bit as defined in this section would only indicate extended precision denormalized numbers (which occur very infrequently).

As previously noted, the proposed IEEE standard defines the following four relations and mandates their generation only as a result of a floating point compare operation. The processor of the present invention is capable of generating these relations at the end of all move and arithmetic instructions involving the floating point data registers except for the move multiple instructions:
EQ Equal to
GT Greater than
LT Less than
UN Unordered The unordered relation occurs when one or both of the operands in a floating point compare is a NAN.

It is significant that the setting of the condition codes is independent of the operation executed; the condition codes simply indicate the data type of any result generated. It has been discovered that by using this set of condition codes the IEEE defined relations can be derived from the data type of the result. This is different from conventional processors where the setting of integer condition codes is dependent upon the operation executed as well as the result.

These condition codes are used to generate the IEEE relations by using the following formulas:
EQ = Z
GT = not (N+NAN+Z)
LT = N.not (NAN+Z)
UN = NAN
(where . = logical "AND"
and + = logical "OR")

Ultimately, in a floating point processor, to be useful, these condition codes (and relations) are used to cause conditional branches or traps to be taken (or identified) for each meaningful combination of conditions. In the instant invention, these condition codes are used to affirm or disaffirm 32 predicates. The following table gives the 32 predicates used:

| Predicate (CPRED) Bits: 5 4 3 2 1 | Mnemonic | Description (Branch or trap if...) |
|---|---|---|
| 0 0 0 0 0 | F | False |
| 0 0 0 0 1 | EQ | Equal |
| 0 0 0 1 0 | OGT | Ordered or Greater Than |
| 0 0 0 1 1 | OGE | Ordered or Greater Than or Equal |
| 0 0 1 0 0 | OLT | Ordered or Less Than |
| 0 0 1 0 1 | OLE | Ordered or Less Than or Equal |
| 0 0 1 1 0 | OGL | Ordered or Greater or Less Than |
| 0 0 1 1 1 | OR | Ordered |
| 0 1 0 0 0 | UN | Unordered |
| 0 1 0 0 1 | UEQ | Unordered or Equal |
| 0 1 0 1 0 | UGT | Unordered or Greater Than |
| 0 1 0 1 1 | UGE | Unordered or Greater Than of Equal |
| 0 1 1 0 0 | ULT | Unordered or Less Than |
| 0 1 1 0 1 | ULE | Unordered or Less Than or Equal |
| 0 1 1 1 0 | NEQ | Not Equal |
| 0 1 1 1 1 | T | True |
| 1 0 0 0 0 | SF | Signalling False |
| 1 0 0 0 1 | SEQ | Signalling Equal |
| 1 0 0 1 0 | GT | Greater Than |
| 1 0 0 1 1 | GE | Greater Than or Equal |
| 1 0 1 0 0 | LT | Less Than |
| 1 0 1 0 1 | LE | Less Than or Equal |
| 1 0 1 1 0 | GL | Greater or Less Than |
| 1 0 1 1 1 | LEG | Less Than, Equal or Greater Than |
| 1 1 0 0 0 | NLEG | Not (Less Than, Equal or Greater Than) |
| 1 1 0 0 1 | NGL | Not (Greater Than or Less Than) |
| 1 1 0 1 0 | NLE | Not Less Than or Equal |
| 1 1 0 1 1 | NLT | Not Less Than |
| 1 1 1 0 0 | NGE | Not Greater Than or Equal |
| 1 1 1 0 1 | NGT | Not Greater Than |
| 1 1 1 1 0 | SNEQ | Signalling Not Equal |
| 1 1 1 1 1 | ST | Signalling True |

Figure 4:
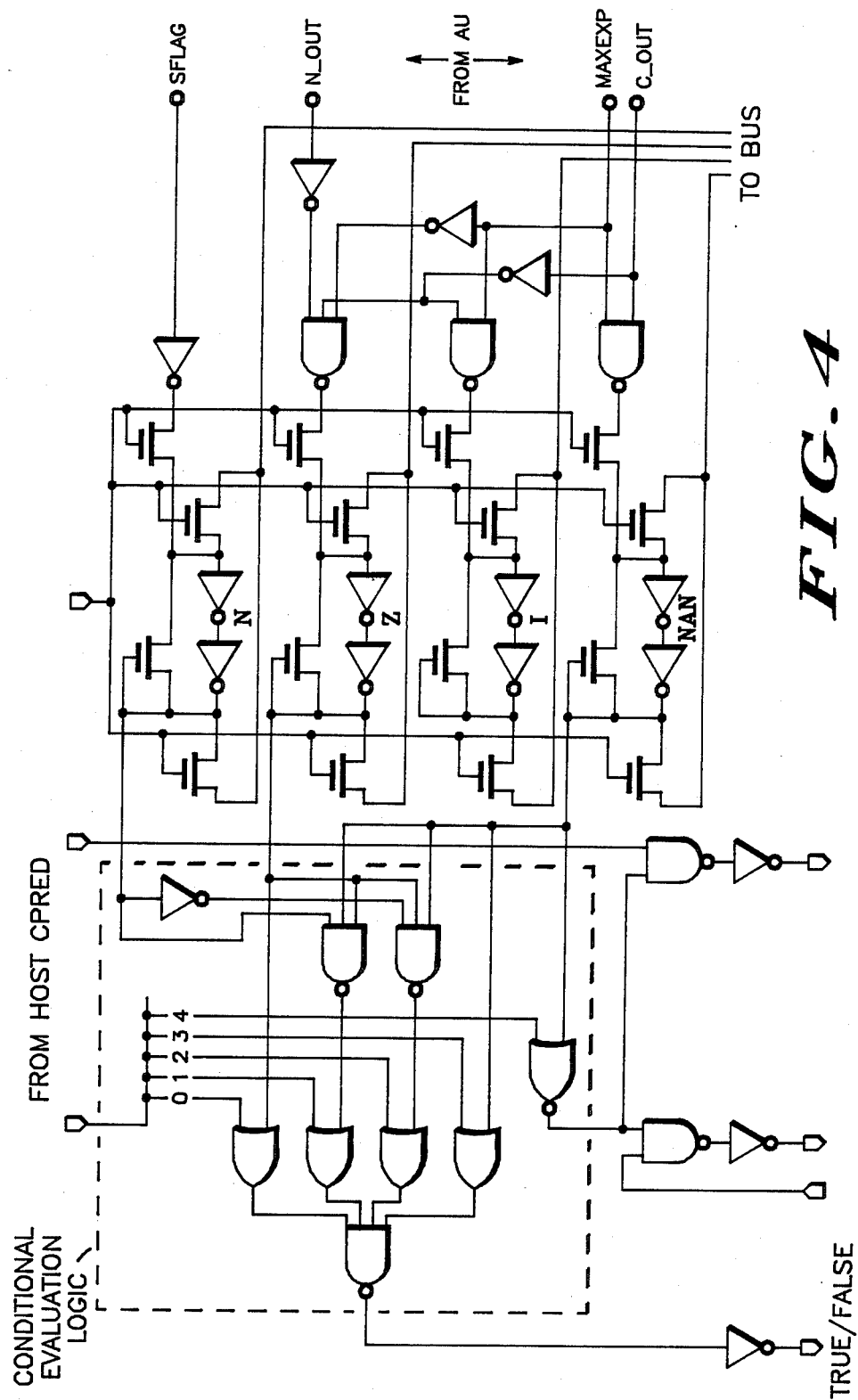
FIG. 4 is a logic diagram showing logic which may be utilized to generate certain condition codes in accordance with the invention.

For a given host processor instruction the predicate of interest is loaded into the Bus Interface Unit (12) by the host processor whereupon the logic shown in FIG. 4 combines the predicate and the floating point condition codes (FPCCs) to generate a "T/F" output to the host. The host processor then uses this output to cause a conditional branch or trap to be taken if true and not taken if false.

The following table describes the BIU logic of FIG. 4 which generates the T/F signal:

| CR1 (0-5) = | | TRUE CONDITIONS | | | | |
|---|---|---|---|---|---|---|
| CPRED 5 4 3 2 1 0 | MNEMONIC | un | lt | gt | eq | TEST FOR TRUE |
| 0 0 0 0 0 0 | F | | | | 0 | |
| 0 0 0 0 0 1 | EQ | | | | 1 | Z |

-continued

| CR1 (0-5) = | | TRUE CONDITIONS | | | | |
|---|---|---|---|---|---|---|
| CPRED 5 4 3 2 1 0 | MNE MONIC | un | lt | gt | eq | TEST FOR TRUE |
| 0 0 0 0 1 0 | OGT | | | 1 | | not(NAN+Z+N) |
| 0 0 0 0 1 1 | OGE | | | 1 | 1 | Z+not(NAN+N) |
| 0 0 0 1 0 0 | OLT | | 1 | | | N.not(NAN+Z) |
| 0 0 0 1 0 1 | OLE | | 1 | | 1 | Z+N.not(NAN) |
| 0 0 0 1 1 0 | OGL | | 1 | 1 | | not(NAN+Z) |
| 0 0 0 1 1 1 | OR | | 1 | 1 | | not(NAN) |
| 0 0 1 0 0 0 | UN | 1 | | | | NAN |
| 0 0 1 0 0 1 | UEQ | 1 | | | 1 | NAN+Z |
| 0 0 1 0 1 0 | UGT | 1 | | 1 | | NAN+not(N+Z) |
| 0 0 1 0 1 1 | UGE | 1 | | 1 | 1 | NAN+Z+not(N) |
| 0 0 1 1 0 0 | ULT | 1 | 1 | | | NAN+[N.not(Z)] |
| 0 0 1 1 0 1 | ULE | 1 | 1 | | 1 | NAN+Z+N |
| 0 0 1 1 1 0 | NEQ | 1 | 1 | 1 | | not(Z) |
| 0 0 1 1 1 1 | T | 1 | 1 | 1 | 1 | 1 |
| 0 1 0 0 0 0 | SF | | | | | 0 |
| 0 1 0 0 0 1 | SEQ | | | | 1 | Z |
| 0 1 0 0 1 0 | GT | | | 1 | | not(NAN+Z+N) |
| 0 1 0 0 1 1 | GE | | | 1 | 1 | Z+not(NAN+N) |
| 0 1 0 1 0 0 | LT | | 1 | | | N.not(NAN+Z) |
| 0 1 0 1 0 1 | LE | | 1 | | 1 | Z+N.not(NAN) |
| 0 1 0 1 1 0 | GL | | 1 | 1 | | not(NAN+Z) |
| 0 1 0 1 1 1 | LEG | | 1 | 1 | 1 | not(NAN) |
| 0 1 1 0 0 0 | NLEG | 1 | | | | NAN |
| 0 1 1 0 0 1 | NGL | 1 | | | 1 | NAN+Z |
| 0 1 1 0 1 0 | NLE | 1 | | 1 | | NAN+not(N+Z) |
| 0 1 1 0 1 1 | NLT | 1 | | 1 | 1 | NAN+Z+not(N) |
| 0 1 1 1 0 0 | NGE | 1 | 1 | | | NAN+[N.not(Z)] |
| 0 1 1 1 0 1 | NGT | 1 | 1 | | 1 | NAN+Z+N |
| 0 1 1 1 1 0 | SNEQ | 1 | 1 | 1 | | not(Z) |
| 0 1 1 1 1 1 | ST | 1 | 1 | 1 | 1 | 1 |

I claim:

1. A method comprising the steps of:
performing an arithmetic operation on two floating point operands to produce a floating point result;
generating a first set of condition codes comprising:
  Zero (Z) if the result is a floating point zero;
  Negative (N) if the result is negative;
  Not a Number (NaN) if the result is not a floating point number; and
  Infinity (I) if the result is a floating point
logically combining the first set of condition codes to produce a second set of condition codes comprising:
  Equal (EQ) if the result is equal to zero;
  Greater Than (GT) if the result is greater than zero;
  Less Than (LT) if the rsult is less than zero; and
  Unordered (UN) if the result is not a floating point number.

2. The method set forth in claim 1 further comprising the step of:
using the second set of condition codes to answer one or more of a plurality of conditional predicates.

3. The method set forth in claim 1 wherein the condition code Equal (EQ) is logically equal to the condition code Zero (Z).

4. The method set forth in claim 1 wherein the condition code Greater Than (GT) is logically equal to the logical NOT of the logical OR of the condition codes Negative (N), Not a Number (NaN) and Zero (Z).

5. The method set forth in claim 1 wherein the condition code Less Than (LT) is logically equal to the logical AND of the condition code Negative (N) and the logical NOT of the logical OR of the condition codes Not a Number (NaN) and Zero (Z).

6. The method set forth in claim 1 wherein the condition code Unordered (UN) is logically equal to the condition code Not a Number (NaN).

7. A numeric data processor comprising:
first means for performing an arithmetic operation on two floating point operands to produce a floating point result;
second means, coupled to said first means, for generating a first set of condition codes comprising:
  Zero (Z) if the result is a floating point zero;
  Negative (N) if the result is negative;
  Not a Number (NaN) if the result is not a floating point number; and
  Infinity (I) if the result is a floating point infinity; and
third means, coupled to said second means, for logically combining the first set of condition codes to produce a second set of condition codes comprising:
  Equal (EQ) if the result is equal to zero;
  Greater Than (GT) if the result is greater than zero;
  Less Than (LT) if the result is less than zero; and
  Unordered (UN) if the result is not a floating point number.

8. A numerical data processor as set forth in claim 7 further comprising:
fourth means for using the second set of condition codes to answer one or more of a plurality of conditional predicates.

9. A method comprising the steps of:
performing an arithmetic operation on two floating point operands to produce a floating point result;
generating a first set of condition codes comprising:
  the sign of the result (SIGN_FLAG);
  the explicit integer part bit of the significand of the result (N_OUT);
  the logical OR of all of the fraction bits of the significand of the result (C_OUT); and
  an indication (MAXEXP) if the exponent of the result is equal to the maximum allowable value +1;
logically combining the first set of condition codes to produce a second set of condition codes comprising:
  Zero (Z) indicating that the result is a floating point zero;
  Negative (N) indicating that the result is negative;
  Not a Number (NaN) indicating that the result is not a floating point number; and
  Infinity (I) indicating that the result is a floating point infinity; and
logically combining the second set of condition codes to produce a third set of condition codes comprising:
  Equal (EQ) if the result is equal to zero;
  Greater Than (GT) if the result is greater than zero;
  Less Than (LT) if the result is less than zero; and
  Unordered (UN) if the result si not a floating point number.

10. The method set forth in claim 9 wherein:
Zero (Z) is the logical AND of the logical NOT of MAXEXP, the logical NOT of C_OUT and the logical NOT of N_OUT;
Negative (N) is logically equal to SIGN_FLAG;
Not a Number (NaN) is the logical AND of MAXEXP and C OUT; and Infinity (I) is the logical AND of MAXEXP and the logical NOT of C_OUT.

11. The method set forth in claim 10 wherein:

Equal (EQ) is logically equal to Zero (Z);

Greater Than (GT) is logically equal to the logical NOT of the logical OR of Negative (N), Not a Number (NaN) and Zero (Z);

Less Than (LT) is logically equal to the logical AND of Negative (N) and the logical NOT of the logical OR of Not a Number (NaN) and Zero (Z); and Unordered (UN) is logically equal to Not a Number (NaN).

12. A method comprising the steps of:

performing a move operation on a floating point operand; generating a first set of condition codes comprising:

Zero (Z) if the operand is a floating point zero;

Negative (N) if the operand is negative;

Not a Number (NaN) if the operand is not a floating point number; and

Infinity (I) if the operand is a floating point infinity; and logically combining the first set of condition codes to produce a second set of condition codes comprising:

Equal (EQ) if the operand is equal to zero;

Greater Than (GT) if the operand is greater than zero;

Less Than (LT) if the operand is less than zero; and

Unordered (UN) if the operand is not a floating point number.

13. The method set forth in claim 12 wherein:

Equal (EQ) is logically equal to Zero (Z);

Greater Than (GT) is logically equal to the logical NOT of the logical OR of Negative (N), Not a Number (NaN) and Zero (Z);

Less Than (LT) is logically equal to the logical AND of Negative (N) and the logical NOT of the logical OR of Not a Number (NaN) and Zero (Z); and Unordered (UN) is logically equal to Not a Number (NaN).

14. A method comprising the steps of:

performing a move operation on a floating point operand;

generating a first set of condition codes comprising:

the sign of the operand (SIGN_FLAG);

the explicit integer part bit of the significand of the operand (N_OUT);

the logical OR of all of the fraction bits of the significand of the operand (C_OUT); and an indication (MAXEXP) if the exponent of the operand is equal to the maximum allowable value +1;

logically combining the first set of condition codes to produce a second set of condition codes comprising:

Zero (Z) indicating that the operand is a floating point zero;

Negative (N) indicating that the operand is negative;

Not a Number (NaN) indicating that the operand is not a floating point number; and Infinity (I) indicating that the operand is a floating point infinity; and logically combining the second set of condition codes to produce a third set of condition codes comprising:

Equal (EQ) if the operand is equal to zero;

Greater Than (GT) if the operand is greater than zero;

Less Than (LT) if the operand is less than zero; and

Unordered (UN) if the operand is not a floating point number.

15. The method set forth in claim 14 wherein:

Zero (Z) is the logical AND of the logical NOT of MAXEXP, the logical NOT of C_OUT and the logical NOT of N_OUT;

Negative (N) is logically equal to SIGN_FLAG;

Not a Number (NaN) is the logical AND of MAXEXP and C_OUT; and

Infinity (I) is the logical AND of MAXEXP and the logical NOT of C_OUT.

16. The method set forth in claim 15 wherein:

Equal (EQ) is logically equal to Zero (Z);

Greater Than (GT) is logically equal to the logical NOT of the logical OR of Negative (N), Not a Number (NaN) and Zero (Z);

Less Than (LT) is logically equal to the logical AND of Negative (N) and the logical NOT of the logical OR of Not a Number (NaN) and Zero (Z); and Unordered (UN) is logically equal to Not a Number (NaN).

17. A method comprising the steps of:

generating a first set of condition codes indicative of the data type of a floating point operand, the first set of condition codes comprising:

Zero (Z) if the operand is a floating point zero;

Negative (N) if the operand is negative;

Not a Number (NaN) if the operand is not a floating point number; and

Infinity (I) if the operand is a floating point infinity; and logically combining the first set of condition codes to produce a second set of condition codes comprising:

Equal (EQ) if the operand is equal to zero;

Greater Than (GT) if the operand is greater than zero;

Less Than (LT) if the operand is less than zero; and

Unordered (UN) if the operand is not a floating point number.

18. The method set forth in claim 17 further comprising the step of:

using the second set of condition codes to answer one or more of a plurality of conditional predicates.

19. A method comprising the steps of:

generating a first set of condition codes indicative of the data type of a floating point operand, the first set of condition codes comprising:

the sign of the operand (SIGN_FLAG);

the explicit integer part bit of the significand of the operand (N_OUT);

the logical OR of all of the fraction bits of the significand of the operand (C_OUT); and an indication (MAXEXP) if the exponent of the operand is equal to the maximum allowable value +1;

logically combining the first set of condition codes to produce a second set of condition codes comprising:

Zero (Z) indicating that the operand is a floating point zero;

Negative (N) indicating that the operand is negative;

Not a Number (NaN) indicating that the operand is not a floating point number; and Infinity (I) indicating that the operand is a floating point infinity; and logically combining the second set of condition codes to produce a third set of condition codes comprising:

Equal (EQ) if the operand is equal to zero;

Greater Than (GT) if the operand is greater than zero;

Less Than (LT) if the operand is less than zero; and

Unordered (UN) if the operand is not a floating point number.

20. The method set forth in claim 19 further comprising the step of:

using the third set of condition codes to answer one or more of a plurality of conditional predicates.

* * * * *